(12) United States Patent
Green et al.

(10) Patent No.: US 10,795,569 B2
(45) Date of Patent: *Oct. 6, 2020

(54) TOUCHSCREEN DEVICE

(71) Applicant: INTERNATIONAL BUSINESS MACHINES CORPORATION, Armonk, NY (US)

(72) Inventors: Sophie D. Green, Surrey (GB); Grace Jansen, Southampton (GB); Joe Pavitt, Hampshire (GB); Antony Protonotarios, Chichester (GB); James Russell, Chertsey (GB); Alexandros E. Vlissidis, Bath (GB)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/276,727

(22) Filed: Feb. 15, 2019

(65) Prior Publication Data

US 2019/0179508 A1 Jun. 13, 2019

Related U.S. Application Data

(63) Continuation of application No. 15/437,632, filed on Feb. 21, 2017, now Pat. No. 10,241,669.

(51) Int. Cl.
*G06F 3/0488* (2013.01)
*G06F 3/0481* (2013.01)
(Continued)

(52) U.S. Cl.
CPC .......... *G06F 3/0488* (2013.01); *G06F 3/0481* (2013.01); *G06F 3/0482* (2013.01);
(Continued)

(58) Field of Classification Search
CPC .... G06F 3/0484; G06F 3/0481; G06F 3/0488; G06F 3/04886; G06F 3/0482; G06F 2203/04803
See application file for complete search history.

(56) References Cited

U.S. PATENT DOCUMENTS 8,255,836 B1    8/2012  Gildfind
9,122,328 B2    9/2015  Ananthapadmanabh et al.
(Continued)

OTHER PUBLICATIONS

User Experience Stack Exchange, "Alternatives for Preventing Accidental Touch Issues", http://www.ux.stackexchange.com/questions/72082/alternatives-for-preventing-accidental-touch-issues, Jan. 16, 2015 (3 pages).

(Continued)

*Primary Examiner* — William L Bashore
*Assistant Examiner* — Gregory A Distefano
(74) *Attorney, Agent, or Firm* — Tihon Poltavets, Esq.; Kevin P. Radigan, Esq.; Heslin Rothenberg Farley & Mesiti P.C.

(57) ABSTRACT

A method is provided which includes displaying an output of an application on a touchscreen, receiving a user input for the application on the touchscreen, and determining the location of the received user input on the touchscreen. Further, the method includes generating an additional pop-up window for display on the touchscreen, and selecting a location for the additional pop-up window, where the selected location for the additional pop-up window does not coincide with the determined location of the user input for application. Further, the method includes displaying the additional pop-up window at the selected location for the additional pop-up window.

18 Claims, 6 Drawing Sheets

(51) Int. Cl.
*G06F 3/0484* (2013.01)
*G06F 3/0482* (2013.01)

(52) U.S. Cl.
CPC ........ *G06F 3/0484* (2013.01); *G06F 3/04886* (2013.01); *G06F 2203/04803* (2013.01)

(56) References Cited

U.S. PATENT DOCUMENTS

| | | | |
|---|---|---|---|
| 9,244,545 B2 | 1/2016 | Hinckley et al. | |
| 2013/0155118 A1* | 6/2013 | Robinson | G06F 16/34 |
| | | | 345/672 |
| 2013/0222331 A1* | 8/2013 | Kyrynyuk | G06F 3/044 |
| | | | 345/174 |
| 2014/0049494 A1 | 2/2014 | Niu et al. | |
| 2014/0068498 A1 | 3/2014 | Olsen et al. | |
| 2014/0347312 A1 | 11/2014 | Siska | |
| 2015/0089443 A1 | 3/2015 | Lee et al. | |
| 2015/0227334 A1* | 8/2015 | Dostal | G06F 3/013 |
| | | | 345/589 |
| 2016/0011755 A1 | 1/2016 | Douek et al. | |
| 2016/0179324 A1 | 6/2016 | Santos-Gomez | |
| 2018/0239510 A1 | 8/2018 | Green et al. | |

OTHER PUBLICATIONS

Neil Hughes, "Apple's Invention for Touch-Sensitive Buttons Could Prevent Accidental Inputs", http://www.appleinsider.com/articles/14/05/06/apples-concept-for-touch-sensitive-buttons-could-prevent-accidental-inputs, May 6, 2014 (7 pages).

Green et al., "List of IBM Patents and/or Patent Applications Treated as Related", U.S. Appl. No. 16/276,727, filed Feb. 15, 2019, dated Feb. 15, 2019 (2 pages).

\* cited by examiner

TOUCHSCREEN DEVICE

BACKGROUND

The present invention relates to a touchscreen device, a method of operating the touchscreen device and a computer program product for performing the method of operating the touchscreen device.

Touchscreen devices are widely used, particularly in modern smartphones, which often have a touchscreen that outputs a display to the user and also receives inputs from the user, allowing the user to interact with the smartphone's operating system and with applications being run by the smartphones. Different touchscreen technologies are available, some of which support the use of a finger touching the touchscreen and others that, in addition or alternatively to a finger touch, allow a stylus or pen to be used when interacting with the touchscreen. Touchscreens generally support multiple touches on the touchscreen and can detect different types of gesture beyond a simple touch, such as a swipe by a user's finger across a touchscreen.

When a user of a touchscreen device is rapidly touching the screen, such as when typing or playing a game, if a pop-up window is displayed on the touchscreen it is easy for the user to accidentally dismiss the message or press an undesired option. This is a problem because either the user dismisses the message before having had time to read the content of the pop-up window, or the user inadvertently selects one of the options on the pop-up window which could cause an unwanted action to happen, such as taking the user to a different location or application, interrupting their current activity or losing text that is being typed at that point by the user. A common example is the appearance of a pop-up window which notifies the user that the phone battery is low in power and supplies the user with different options relating to this notification such as switching to a low power mode or accessing a systems menu that shows the power being consumed by current applications. If the user is typing on the touchscreen when this pop-up window appears, they may well select an option that takes the user away from the current application, which is disruptive and can lead to the loss of material being currently typed by the user.

SUMMARY

Provided herein, in one or more aspects, is a method, which includes displaying an output of an application on a touchscreen, and receiving a user input for the application on the touchscreen. Further, the method includes determining the location of the received user input on the touchscreen, generating an additional pop-up window for display on the touchscreen, selecting a location for the additional pop-up window, where the selected location for the additional pop-up window does not coincide with the determined location of the user input for the application, and displaying the additional pop-up window at the selected location for the additional pop-up window.

Devices and computer program products relating to one or more aspects, such as those summarized above or described herein, are also described and claimed herein.

Additional features and advantages are realized through the techniques described herein. Other embodiments and aspects are described in detail herein, and may be considered a part of the claimed aspects.

BRIEF DESCRIPTION OF THE DRAWINGS

Embodiments of the present invention are described below, by way of example only, with reference to the drawings, in which.

DETAILED DESCRIPTION

Figure 1:
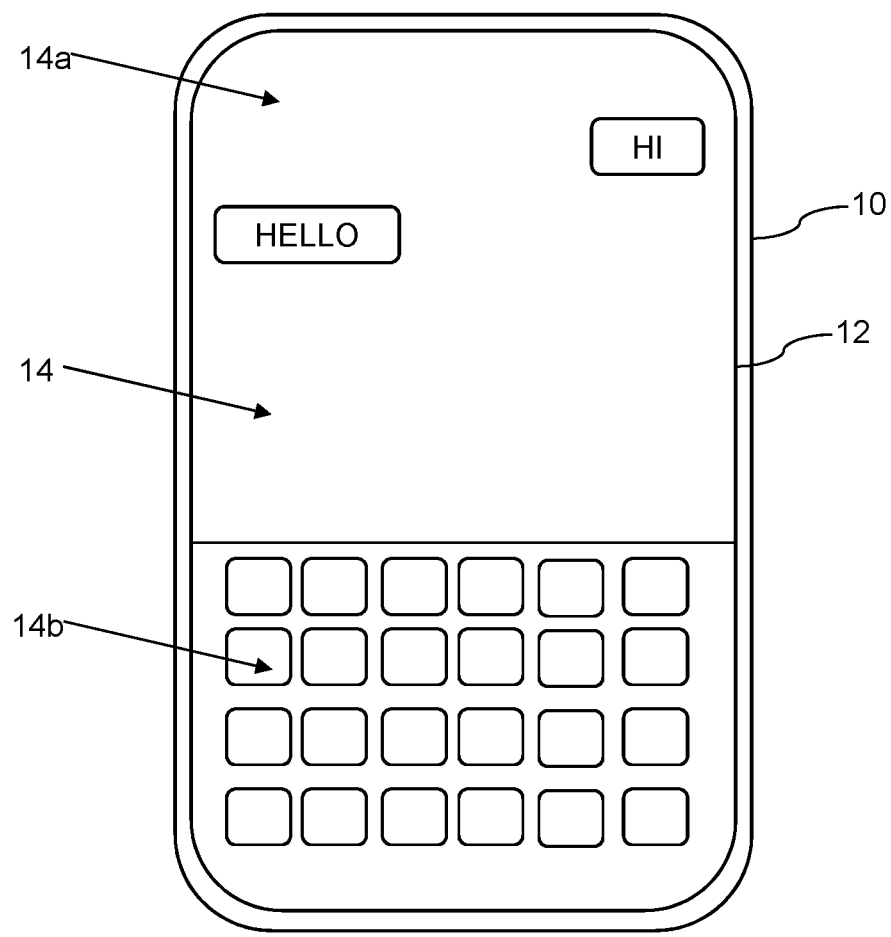
FIG. 1 depicts one embodiment of a touchscreen device running an instant messaging application.

As noted, according to an aspect of the present invention, a method is provided herein which includes displaying an output of an application on a touchscreen, receiving a user input for the application on the touchscreen, determining the location of the received user input on the touchscreen, generating an additional pop-up window for display on the touchscreen, selecting a location for the additional pop-up window, the selected location for the additional pop-up window not coinciding with the determined location of the user input for application, and displaying the additional pop-up window at the selected location for the additional pop-up window.

According to another aspect of the present invention, a device is provided which includes a touchscreen arranged to display an output of an application and receive a user input for the application, and a processor arranged to determine the location of the received user input on the touchscreen, generate an additional pop-up window for display on the touchscreen, and select a location for the additional pop-up window, the selected location for the additional pop-up window not coinciding with the determined location of the user input for application, the touchscreen further arranged to display the additional pop-up window at the selected location for the additional pop-up window.

According to a further aspect of the present invention, a computer program product is provided for controlling a device, the computer program product includes a computer readable storage medium having program instructions embodied therewith, and the program instructions are executable by a processor to cause the processor to display an output of an application on a touchscreen, receive a user input for the application on the touchscreen, determine the location of the received user input on the touchscreen, generate an additional pop-up window for display on the touchscreen, select a location for the additional pop-up window, the selected location for the additional pop-up window not coinciding with the determined location of the user input for application, and display the additional pop-up window at the selected location for the additional pop-up window.

Advantageously, disclosed herein is a device with a touchscreen that will not display a pop-up window at the location where the user is currently interacting with the touchscreen. The touchscreen device continually monitors the location of the current touchscreen touches by the user and stores this information. When a new pop-up window is to be displayed on the touchscreen, the information about the location of user's previous touches is accessed and the location of the pop-up window is selected so that the selected location does not coincide with the location where the user is currently (or recently) touching the screen.

The device tracks where on the touchscreen the user is/has been pressing. In one or more embodiments, when a pop-up window is about to show an alert, the location of the pop-up window's virtual buttons are compared with where the touchscreen has been recently touched and if there is not a clash in location, the pop-up will be displayed. If the virtual buttons of the alert overlap with where the user has just pressed or is likely to press then the pop-up window would be relocated to another area of the touchscreen, where the user is less likely to accidentally press a button before noticing the pop-up window. An example use case is where the user is typing on a virtual keyboard, which involves rapidly touching the screen within the keyboard area, so if a pop-up window was shown in the middle of the screen where the buttons at the bottom overlap the keyboard area it would be easy for the user to accidentally press an unintended button.

By comparing the location of the buttons with a heat map, this not only moves the pop-up window away from where the user has just pressed, but also moves the pop-up window away from areas that the user is likely to press and so has a predictive element. The device may store a heat map of where the user has touched the touchscreen so that the hot areas of the heat map are where the user has recently and frequently pressed. When a pop-up window is about to be shown, a comparison of the default location of the interactive parts of the pop-up window with the heat map is made. If the button areas of the pop-up window overlap with a "hot" zone on the heat map, then the pop-up window may be repositioned. The location of the new pop-up window may be selected such that the location overlaps with areas of the screen that are less hot.

The selecting of a location for the additional pop-up window, where the selected location for the additional pop-up window does not coincide with the determined location of the user input for an application, may include accessing a default location for the additional pop-up window, comparing the default location for the pop-up window to the determined location of the user input for the application and changing the default location for the additional pop-up window if the default location coincides with the determined location of the user input for the application. Many pop-up windows have a default location associated therewith. The pop-up window is meant to be displayed at the same location on the touchscreen and this default location can be accessed and checked to see that the default location does not coincide with the current location of the user's touches. If there is a conflict, then the default location of the pop-up window may be changed.

Alternatively, the selecting of a location for the additional pop-up window, where the selected location for the additional pop-up window does not coincide with the determined location of the user input for application, may include creating a location for the additional pop-up window such that the created location does not coincide with the determined location of the user input for the application. If there is no default location for the additional pop-up window, then a location is created for the pop-up window that does not coincide with the user's current touches on the touchscreen.

Advantageously, the method may further include, following the determining of the location of the received user input on the touchscreen, generating a heat map for the touchscreen, the heat map recording the locations of the received user inputs on the touchscreen. A heat map can be used as a way of keeping track of the user's touches on the touchscreen. A heat map is a data array that receives inputs that are recorded as values within the heat map and each input also populates values at adjacent locations. The values within the heat map decay over time. Heat maps can be represented visually using different colors to represent the values within the heat map and the visualization looks like heat conducting between points and cooling over time. A heat map may essentially be controlled by two functions, a first function that determines how values populate to adjacent locations within the heat map and a second function that determines how the values decay over time. The parameters of these two functions can be set or adjusted by the user over time. The advantage of using a heat map for the touches on the touchscreen is that effectively a history of the user's touches is recorded within the heat map and this greatly increases the reliability of the selection of the location for the additional pop-up window. Each time the user touches the touchscreen, an entry in made within the heat map and values are generated in adjacent parts of the heat map. This ensures that the selection of the location for the pop-up window within the touchscreen is away from locations that have been recently touched by the user. A single global heat map can be used that represents all touches on the touchscreen of the device or multiple different heat maps can be used, where each heat map may be specific to an application that the user is currently accessing. In the latter case, multiple heat maps may be maintained by the device and the heat map specific to the current application that the user is using may be accessed when a new pop-up window is to be generated.

In one or more embodiments, the heat map defines a matrix of values for locations forming the area of the touchscreen, with each value being generated by a function processing the location of the received user input on the touchscreen, and the selecting of a location for the additional pop-up window, such that the additional pop-up window does not coincide with the determined location of the user input for application, may include selecting a location where the values of the heat map are below a predetermined threshold. The values within the heat map may be used to select the location of the pop-up window that is displayed on the touchscreen. As values are entered into the heat map, and the functions controlling the heat map create values in adjacent locations within the matrix of values, then the heat map defines those locations that are currently "hot" on the touchscreen and therefore where the pop-up window should not be located. A threshold can be applied to the values in the matrix and only areas of the touchscreen that have a value in the matrix below the threshold can be used to locate the pop-up window.

By way of example, FIG. 1 shows a touchscreen device 10, such as a mobile phone, commonly referred to as a smartphone. The device 10 includes a front-facing touchscreen 12, which displays an output and can also receive inputs from a user, through the user touching the touchscreen 12 with their finger(s). The device 10 also includes a processor that is connected to the touchscreen 12 and controls the display on the touchscreen 12, and that processes inputs received from touchscreen 12. The processor is also connected to other internal components, such as a battery, a storage device, cache memory, one or more wireless network components and so on. The processor controls the operation of the touchscreen device 10.

Touchscreen device 10 runs applications 14 which are displayed to the user on the touchscreen 12 and with which the user can interact via the touchscreen 12. For example, in FIG. 1 an instant messaging application 14 is shown, which allows the user of device 10 to communicate with one or more other people via a text chat service. Here, the top portion 14*a* of the application 14 shows the text conversation and the bottom portion 14*b* of the application 14 shows a virtual keyboard on which the user can press in order to communicate via the instant messaging application 14. The user types messages by pressing the virtual keys of the keyboard to create a text message for sending.

Instant messaging applications are common on smartphones and although the available display area for the virtual keyboard is relatively small compared to a conventional desktop computer's keyboard, skilled users of such applications can type at a reasonably fast pace, aided by spell checking and spell correcting functions within the application. This means that users can be typing quickly on their touchscreen 12 and the sudden appearance of an additional pop-up window on the touchscreen 12 can be disruptive to the user, and can also lead to inadvertent interactions with the pop-up window. For instance, options within a pop-up window can be selected by accident by the user, before the user has time to properly evaluate the contents of the pop-up window.

Figure 2:
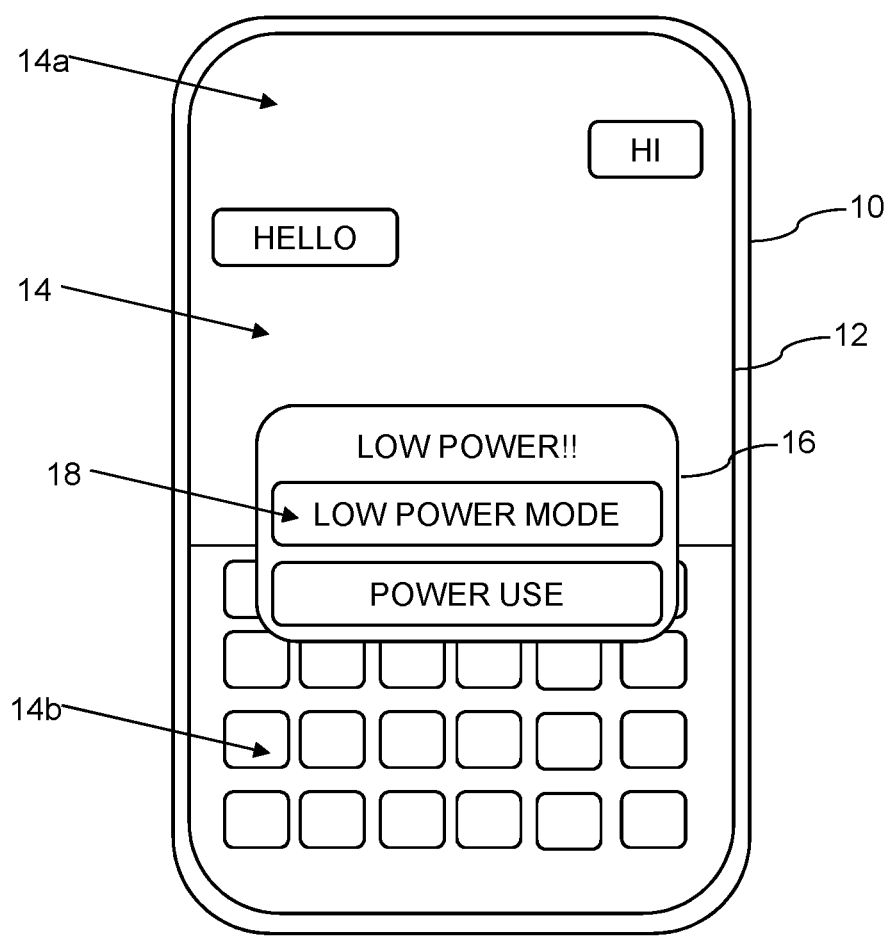
FIG. 2 depicts the touchscreen device embodiment of FIG. 1, with an additional pop-up window to be relocated, in accordance with one or more aspects of the present invention.

FIG. 2 shows device 10 after a pop-up window 16 has been generated by the operating system and processor of device 10. Within pop-up window 16 are presented a number of options 18, one of which can be selected by the user by touching the relevant virtual button within pop-up window 16 on touchscreen 12. Here pop-up window 16 has been displayed on touchscreen 12 in a default location in the center of touchscreen 12, which as can be seen, may obscure part of the virtual keyboard 14*b* that the user is currently using as part of their interaction with the instant messaging application. The processor of device 10 controls the location of the displayed pop-up window 16.

As noted, device 10 may be controlled so that a pop-up window 16 is displayed in a location on touchscreen 12 that is not going to obscure the current task that the user is undertaking. This may be achieved by device 10 tracking of the user's recent touches on touchscreen 12. In one embodiment, a time window is used, such as five seconds, and all of the user's touches on the touchscreen 12 are recorded for five seconds, with the time window moving forward so that any touches older than five seconds are discarded and any new touches are recorded. The processor of device 10 may facilitate maintaining a record of the recent touches.

This information about the user's recent touches may be used to control the location of any pop-up window 16 that is to be generated and displayed on touchscreen 12. For example, if pop-up window 16 has a default location, then the default location may be compared to the information stored by the processor about the recent touches made by the user on touchscreen 12. If there is a conflict between the recorded touches and the default location for pop-up window 16, then the default location may be changed so that there is no conflict with the recorded touches. The location for pop-up window 16 may be selected in order to avoid the parts of the touchscreen 12 that the user has recently touched.

Figure 3:
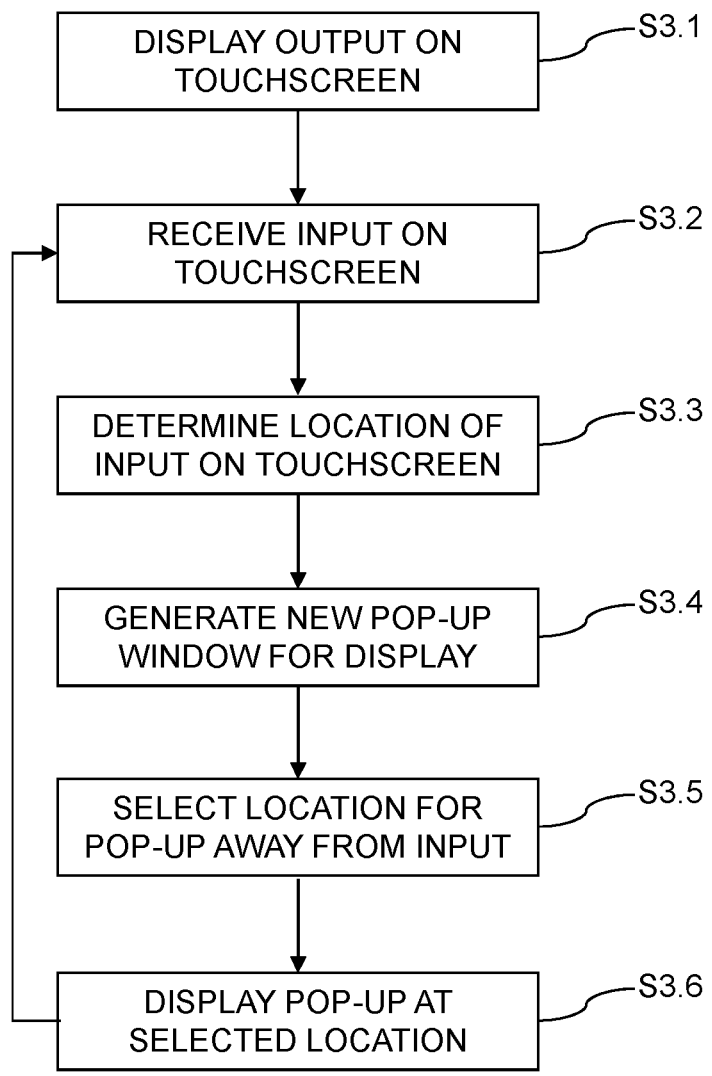
FIG. 3 illustrates one embodiment of a method of operating a touchscreen device, in accordance with one or more aspects of the present invention.

One embodiment of a process of selecting the location for the pop-up window 16 is shown in FIG. 3. A first step in the method is step S3.1, which includes displaying an output of an application 14 on the touchscreen 12. A second step of the method is step S3.2, which includes receiving a user input for the application 14 on the touchscreen 12 and a third step of the method is step S3.3, which includes determining the location of the received user input on the touchscreen 12. The processor may determine the location of the user's touches and store the location information to maintain information about recent touches on touchscreen 12.

A next step of the method is step S3.4, which includes generating an additional pop-up window 16 for display on the touchscreen 12. This may be followed by step S3.5, which includes selecting a location for the additional pop-up window 16, the selected location for the additional pop-up window 16 not coinciding with the determined location of the user input for application 14, and a further step of the method is step S3.6, which includes displaying the additional pop-up window 16 at the selected location for the additional pop-up window 16. In this way, the pop-up window 16 may be displayed on touchscreen 12 away from the area in which the user is currently working.

As noted, the processor may maintain information about recent touches and this can be done in a number of different ways. One way that this can be achieved is for the processor to generate a heat map for touchscreen 12, where the heat map records the locations of received user inputs on touchscreen 12. A heat map can be maintained that is a two dimensional array or matrix with data entries that represent locations on the touchscreen 12, with a level of granularity that reflects the size of the touches being made by the user. For example, each location within the heat map may represent a 1 mm by 1 mm physical location on touchscreen 12.

Figure 4:
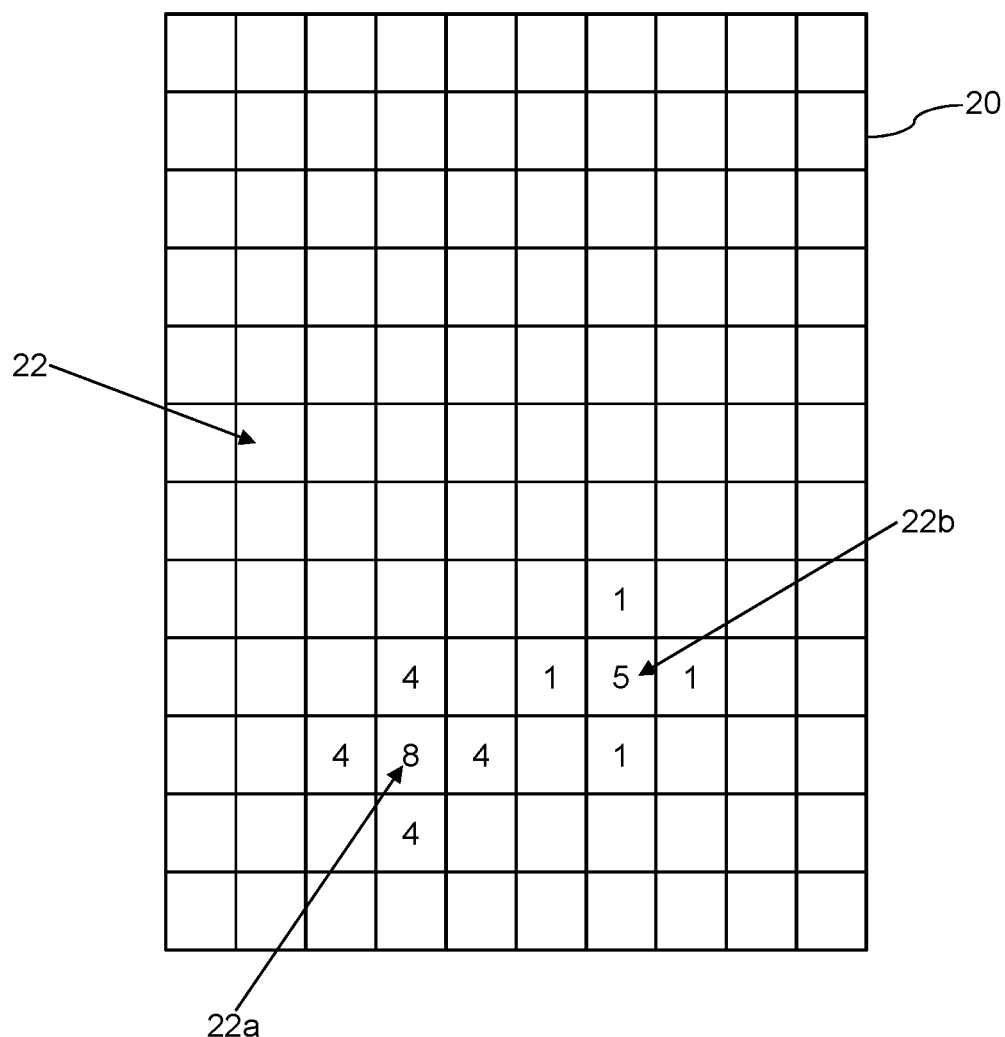
FIG. 4 depicts one embodiment of a heat map, in accordance with one or more aspects of the present invention.

FIG. 4 shows an example of a heat map 20 for touchscreen 12 of device 10 of FIGS. 1 and 2. Heat map 20 is shown to include an array of locations 22 which represent locations within the touchscreen 12. Each location 22 may have a value stored therein, and the values may start at zero and may increase as relevant touches are made on touchscreen 12. The nature of heat map 20 may be such that when a value is increased, then adjacent values are also increased by a proportion of the increase in the first value, according to the operation of a function that determines how the values in the heat map 20 are populated.

In practice, this means that when a user touches touchscreen 12, then a value may be stored in a location 22 within the heat map 20 that corresponds to the user's touch, where the value may be increased by 8, for example. At the same time all adjacent locations 22 may also be increased by 4, for example, according to the populating function. In addition, all values in the heat map 20 may be processed under the action of a time decay function, which reduces each value in the heat map 20 by a specific value per time period, for example −1 every second. This ensures that the information stored within heat map 20 is current information that reflects the user's current activity.

In the example of FIG. 4, two recent touches are shown represented by the locations 22*a* and 22*b*. The location 22*a* is a recent touch, with the value of 8 stored in the location 22*a* and the adjacent locations 22 storing the values of 4. The location 22*b* is an older touch, since the current value stored there is 5 and the adjacent locations 22 store the values of 1, showing the time decay element that has occurred. In reality, the heat map 20 may store a large number of values in a large array; with heat map 20 being shown with a small number of locations 22 for illustrative purposes.

When the processor wishes to generate and display a pop-up window 16, then the processor may access heat map 20 and use the information within heat map 20 to select the location to use for the pop-up window 16. In general, a new pop-up window 16 may either have a default location that will be checked against heat map 20 or there is no default location for the pop-up window 16 and therefore the display location of the pop-up window 16 is to be selected. In one or more embodiments, the processor may make the location decision in order to avoid conflict with the locations that have been touched recently by the user.

The processor can apply a predetermined threshold to the values within heat map 20 and, for instance, only choose a location where the values are below the predetermined threshold. In one example, the threshold could be set at 1, meaning that all locations within the heat map 20 that have a non-zero value should be avoided. Alternatively, the threshold level could be set at (for example) 4, meaning that the location of the pop-up window 16 cannot be selected at any locations where the values in the heat map are 4 or more. This avoids any "hot" locations on touchscreen 12, where the user has touched recently and which should therefore be avoided.

Heat map 20 shown in FIG. 4 may be a global heat map 20 that is recording all touches on touchscreen 12. However, multiple separate heat maps 20 could also be maintained by the processor of device 10, with each heat map 20 being specific to a single application that is being run by the device 10. If separate heat maps 20 are used, then the processor may record touches on the touchscreen 12 in a specific heat map 20 for the current application 14 that the user is accessing and when determining the location of a new pop-up window 16, the processor may consult the heat map 20 that is specific to the current application 14.

Figure 5:
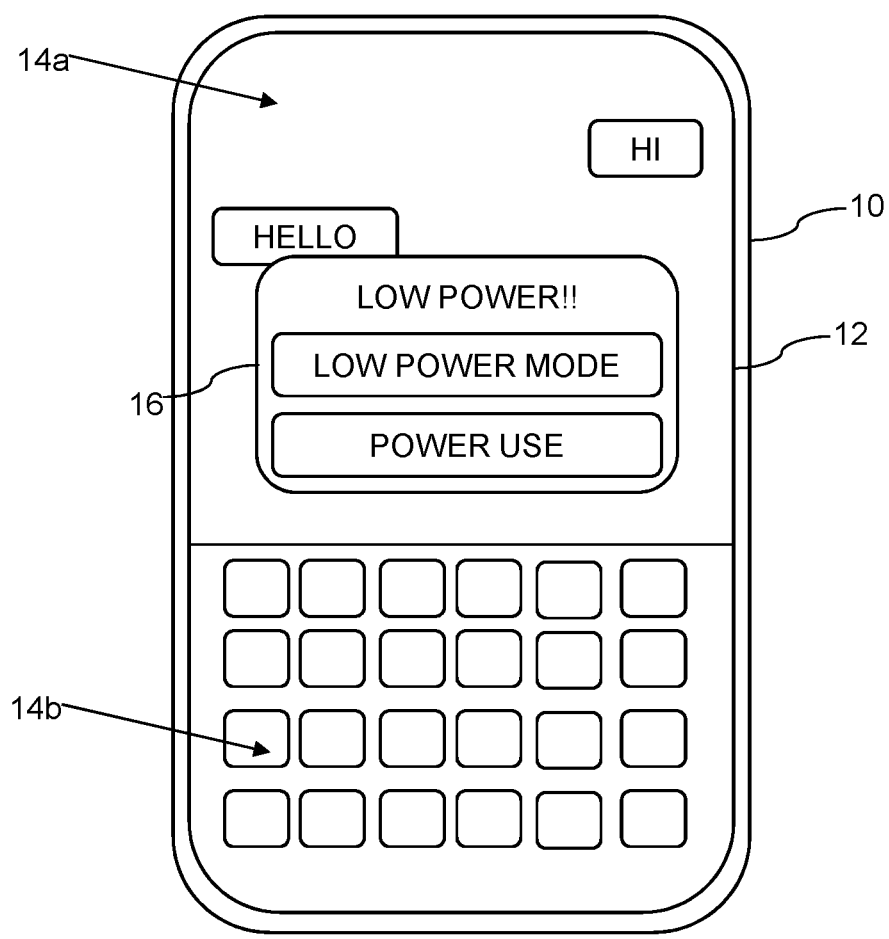
FIG. 5 depicts the touchscreen device embodiment of FIGS. 1 & 2, with the additional pop-up window located, in accordance with one or more aspects of the present invention.

FIG. 5 shows the pop-up window 16 as displayed on the touchscreen 12, once the processor has performed analysis to select a location that is not in conflict with the user's current activity. As can be seen from a comparison with the default location of the pop-up window 16 shown in FIG. 2, the display location of the pop-up window 16 is nearer to the top of touchscreen 12, and away from the keyboard 14*b* being used by the user. This is an example of the default location of a pop-up window 16 being changed by the processor according to the content of the heat map 20, which stores the necessary information that allows the processor to make this decision.

Figure 6:
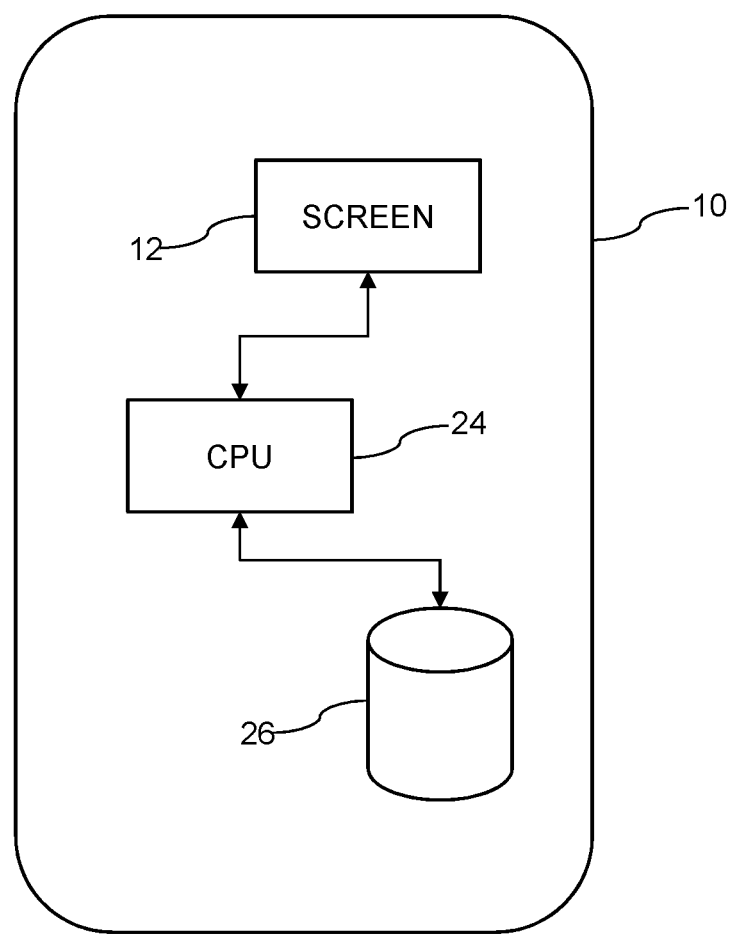
FIG. 6 depicts one embodiment of certain internal components of a touchscreen device, in accordance with one or more aspects of the present invention.

FIG. 6 shows an embodiment of certain internal components of touchscreen device 10. As shown, processor (CPU) 24 may be connected to a storage device 26, and also connected to touchscreen 12. Processor 24 controls the image that is displayed on touchscreen 12 and also receives back from touchscreen 12 the user's input from their touches on the touchscreen 12. Processor 24 may run the operating system that controls the overall operation of device 10. Pop-up windows 16 are generated by processor 24 from the operating system and from applications that are being run by processor 24 (whether those applications are currently being displayed or not).

Processor 24 may also run a computer program product that includes a set of instructions that control the operation of processor 24 with respect to the detection of the locations on the touchscreen 12 of the user's touches. Processor 24 may maintain heat map 20, which is stored, for instance, by the storage device 26. As the user makes touches on touchscreen 12, they are captured by processor 24 and heat map 20 is updated to reflect the new inputs being made on touchscreen 12 by the user. Processor 24 operates the time decay function on the values stored by heat map 20 to reduce the values over time.

Whenever a new pop-up window 16 is to be displayed on touchscreen 12, processor 24 may determine the location of the pop-up window 16 with reference to the contents of heat map 20 stored by storage device 26. If the new pop-up window 16 has a default location (such as the center of the touchscreen 12) then this default location may be checked for conflict with the contents of heat map 20. If there is no default location for the new pop-up window 16, then processor 24 may select a location for the new pop-up window 16 that is away from the "hot" areas of heat map 20.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the FIG.s. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   displaying an output of an application on a touchscreen;
   receiving a user input for the application on the touchscreen;
   determining the location of the received user input on the touchscreen;
   based at least in part on determining the location of received user input on the touchscreen, generating a heat map for the touchscreen, the heat map recording the locations of the received user inputs on the touchscreen as values;
   generating an additional pop-up window for display on the touchscreen;
   selecting a location for the additional pop-up window, the selected location for the additional pop-up window being selected as a location where one or more values of the heat map are below a determined threshold; and
   displaying the additional pop-up window at the selected location for the additional pop-up window.

2. The method according to claim 1, wherein the selecting of the location for the additional pop-up window further comprises accessing a default location for the additional pop-up window, comparing the default location for the pop-up window to the determined location of the user input for the application and changing the default location for the additional pop-up window should the default location coincide with the determined location of the user input for application.

3. The method according to claim 1, wherein the selecting of the location for the additional pop-up window comprises creating a location for the additional pop-up window such that the created location does not coincide with the determined location of the user input for application.

4. The method of claim 1, wherein the values within the heat map decay over time.

5. The method of claim 1, wherein generating the heat map includes generating the heat map using a function that determines how values populate to adjacent locations within the heatmap.

6. The method of claim 5, wherein one or more parameters of the function are adjustable by the user.

7. A device comprising:
   a touchscreen;
   a memory; and
   a processor in communications with the memory; wherein the device performs a method comprising:
      displaying an output of an application on the touchscreen;
      receiving a user input for the application on the touchscreen;
      based at least in part on determining the location of received user input on the touchscreen, generating a heat map for the touchscreen, the heat map recording the locations of the received user inputs on the touchscreen as values;
      generating an additional pop-up window for display on the touchscreen;

selecting a location for the additional pop-up window, the selected location for the additional pop-up window being selected as a location where one or more values of the heat map are below a determined threshold; and displaying the additional pop-up window at the selected location for the additional pop-up window.

8. The device according to claim 7, wherein the selecting of the location for the additional pop-up window further comprises accessing a default location for the additional pop-up window, comparing the default location for the pop-up window to the determined location of the user input for the application and changing the default location for the additional pop-up window should the default location coincide with the determined location of the user input for application.

9. The device according to claim 7, wherein the selecting of the location for the additional pop-up window comprises creating a location for the additional pop-up window such that the created location does not coincide with the determined location of the user input for application.

10. The device of claim 7, wherein the values within the heat map decay over time.

11. The device of claim 7, wherein generating the heat map includes generating the heat map using a function that determines how values populate to adjacent locations within the heatmap.

12. The device of claim 11, wherein one or more parameters of the function are adjustable by the user.

13. A computer program product for controlling a device, the computer program product comprising:

a computer readable storage medium having program instructions embodied therewith, the program instructions being executable by a processor to cause the processor to:

display an output of an application on a touchscreen;

receive a user input for the application on the touchscreen;

based at least in part on determining the location of received user input on the touchscreen, generate a heat map for the touchscreen, the heat map recording the locations of the received user inputs on the touchscreen as values;

determine the location of the received user input on the touchscreen;

generate an additional pop-up window for display on the touchscreen;

select a location for the additional pop-up window, the selected location for the additional pop-up window being selected as a location where one or more values of the heat map are below a determined threshold; and display the additional pop-up window at the selected location for the additional pop-up window.

14. The computer program product according to claim 13, wherein the selecting of the location for the additional pop-up window further comprises accessing a default location for the additional pop-up window, comparing the default location for the pop-up window to the determined location of the user input for the application and changing the default location for the additional pop-up window should the default location coincide with the determined location of the user input for application.

15. The computer program product according to claim 13, wherein the selecting of the location for the additional pop-up window comprises creating a location for the additional pop-up window such that the created location does not coincide with the determined location of the user input for application.

16. The computer program product according to claim 13, wherein the values within the heat map decay over time.

17. The computer program product according to claim 13, wherein generating the heat map includes generating the heat map using a function that determines how values populate to adjacent locations within the heat map.

18. The computer program product according to claim 17, wherein one or more parameters of the function are adjustable by the user.

* * * * *